United States Patent [19]
Baumann et al.

[11] 3,731,853
[45] May 8, 1973

[54] MULTI-CHAMBER RECEPTACLE

[76] Inventors: Erwin Baumann, Nendeln; Gerhard Beham, Lettstrasse 789, Vaduz, both of Liechtenstein

[22] Filed: July 27, 1970

[21] Appl. No.: 58,572

[30] Foreign Application Priority Data

Aug. 1, 1969 Germany..................P 19 39 315.8

[52] U.S. Cl...............222/386, 128/218 M, 128/272
[51] Int. Cl...............................................A61k 5/00
[58] Field of Search....................222/94, 136, 386, 222/398, 5 HI; 128/218 M, 218 D, 272; 206/47 A; 215/6

[56] References Cited

UNITED STATES PATENTS

| | | | |
|---|---|---|---|
| 3,595,439 | 7/1971 | Newby | 222/136 X |
| 1,943,120 | 1/1934 | Kabnick | 128/218 M |
| 2,590,900 | 4/1952 | Sommerstein | 128/272 |
| 3,537,605 | 11/1970 | Solowey | 222/386 X |
| 3,421,662 | 1/1969 | Hanson | 222/541 X |
| 3,415,360 | 12/1968 | Baumann et al. | 206/47 A |

Primary Examiner—Robert B. Reeves
Assistant Examiner—Thomas E. Kocovsky
Attorney—Christel & Bean

[57] ABSTRACT

A multi-chamber receptacle for storing and mixing the ingredients of products such as dental preparations, including a chamber in a casing for storing liquid or pasty material and a piston for closing the chamber during initial storage and for then expelling the material from the chamber into a main chamber in a container where the liquid or pasty material will be mixed with a pulverulent ingredient. The casing has a frangible bottom portion or the like adapted to be ruptured for transfer of the liquid or pasty material to the main chamber.

7 Claims, 7 Drawing Figures

MULTI-CHAMBER RECEPTACLE

It has been proposed heretofore to provide multi-chamber receptacles for receiving ingredients required to make a ready product such as a dental preparation ready for use, the substances being capable of reacting with each other. Individual chambers of prior devices have been separated from each other by easily destroyable membranes, and receptacle parts receiving different components to be mixed have been slidably arranged relative to each other. Instead of employing a membrane, a bag-shaped or tubular storage chamber may be provided in the top cover of the receptacle for receiving one of the components, the storage chamber being formed by a closed, preferably welded pouch of foil. An intermediate member or separator having perforations and spikes facing the pouch of foil if suitable, may be arranged between the main chamber of the receptacle and the pouch.

In receptacles of this type, the usually wall-shaped separator or the pouch of foil are caused to break or burst by moving the parts of the receptacle towards each other, whereby the chambers containing the individual ingredients will be interconnected.

In an improved type of the prior receptacle, the pouch of foil which is suitably filled with a liquid such as phosphoric acid, is arranged to be practically emptied by squeezing or pressing so that the contents of the pouch will be injected into the main chamber; the latter preferably contains a pulverulent substance such as zinc oxide or silicate cement. This type of device has certain advantages; in particular, no foil particles will enter into the mixture.

After the ingredients have been brought into contact with each other in the main chamber a thorough mixing is required. This is normally accomplished by placing the receptacle in the clamping fork of an automatic, oscillating mixer; and an intense mixing action will be obtained with the aid of oscillating motions which rapidly follow each other.

It has been found in the course of further experiments that in some cases it will not be possible with the necessary certainty to encase liquid materials in a welded pouch or tube of foil. Though this problem is less severe in the case of mercury (for preparing amalgams) and phosphoric acid (for preparing dental cements), a carefully welded seam is required even when handling such materials since otherwise the pouch of foil may develop leaks. However, the problem is still more difficult when the liquid material comprises ethereal oils such as clove oil, bergamot oil, eugenol, or similar ethereal oils used in dentistry, or low-boiling organic liquids. These organic liquids include, for example, solvents such as benzine, chloroform, in general aromatic and aliphatic hydrocarbons which may be substituted if desired, carboxylic acids and esters thereof, aldehydes, ketones and the like, as well as monomeric compounds capable of being polymerized such as esters of acrylic and methacrylic acid. These liquid compounds are used, e.g., in the preparation of bases for fillings and of fastening cements, while mixtures of zinc oxide and eugenol or mixtures of zinc oxide and bergamot oil are employed in dentistry for surgical dressings. Monomeric compounds of acrylic or methacrylic acid such as methyl methacrylate are used, for example, together with polymeric acryl pearl polymerizates (as the pulverulent components) for making dentures or parts thereof.

Similar difficulties are encountered if these liquids are mixed with other substances to form a paste.

As indicated with regard to phosphoric acid, the problem is to enclose these liquids or pastes in small pouches or bags of foil by welding and then to empty the pouches or bags by pressure applied from the outside without opening the receptacle, the expelled materials being introduced into the main chamber containing the pulverulent component. The difficulty resides in the fact that the organic liquids mentioned tend to enter the welding seam even during the welding process and afterwards and may then impair the seam by modifying the foil structure so that leaks may develop. Further, it may be difficult or even impossible to encase these organic liquids by welding, due to the permeability of most foil materials (including compound foil comprising aluminum).

An object of the invention is to circumvent the foregoing difficulties by departing from the step of welding a pouch of foil to encase liquid or pasty materials. Instead thereof, the invention provides a casing having a relatively thin bottom portion and forming at least one chamber for storing liquid or pasty material, a tightly fitting piston being movable in the casing towards the bottom thereof.

The invention accordingly relates to a multi-chamber receptacle adapted to receive liquid, pasty and/or pulverulent substances for making a product such as a dental preparation ready for use, the substances being capable of reacting with each other, and the individual chambers being separated from each other by an intermediate member which may be destroyed or ruptured by a force applied from the outside; normally, one or more liquid or pasty materials and one pulverulent ingredient are used; the receptacle comprises (a) a container forming a main chamber for storing the pulverulent ingredient and subsequently mixing it with liquid or pasty material; (b) casing means forming at least one additional chamber for initial storage of the liquid or pasty material and constructed to be resistant thereto during storage, the casing means being inserted in the main chamber at one end thereof and having a bottom arranged to separate the main and additional chambers from each other during initial storage of the pulverulent ingredient and liquid or pasty material, respectively, the bottom including a relatively thin, frangible bottom portion; and (c) piston means resistant to the liquid or pasty material and movable within the casing means in sealing relationship; whereby, through movement of the piston means towards the bottom of the casing means, the liquid or pasty material may be caused to rupture the frangible bottom portion and then enter the container for admixture to the pulverulent ingredient. The casing means may be integral with the bottom including the frangible, relatively thin bottom portion. Instead thereof, however, the casing means may be provided with a perforated bottom and a separate, frangible bottom portion in the form of a relatively thin disk placed on the perforated bottom and secured thereto before liquid or pasty material is introduced into the casing means. The frangible disk may be secured in place by adhesive means, or by welding or partial melting or the like.

As indicated, the casing means and piston means consist of a material which is resistant to the liquid or pasty substances, that is, these parts will not be dissolved or caused to swell when contacted by the liquid or pasty substances. For example, the casing and piston may be made from glass, metal such as aluminum, or inert plastics.

To improve the sealing effect, the piston may be provided with sealing rings or covered with a foil member at its top. However, it is also possible to screw the piston in the casing in sealing relationship. If glass is used, the piston and the casing may be ground together to obtain a tight fit as is well known in the manufacture of syringes.

In the foregoing type of arrangement according to the invention, the casing which may comprise an inner and an outer member is removed from the receptacle after the liquid or pasty material has been forced into the main chamber and mixed with the contents of the latter chamber, whereupon the ready dental preparation is taken out of the container, for example, with the aid of a spatula.

It has been found in the course of further experiments that the removal of the mixed, ready dental preparation may be facilitated to a considerable extent if the casing which may include a perforated outer member is movably arranged in the main chamber at one end thereof while the main chamber is closed at its opposite end by a removable cover or has a nozzle-shaped extension to be opened after the ingredients have been mixed.

Such arrangement is similar to the first embodiment in certain respects in that the liquid or pasty material is forced into the main chamber upon rupture of the frangible bottom portion, whereupon the contents of the main chamber will be well mixed, e.g., in a vibrating or oscillating mixer. However, the casing will then be advanced until the bottom of the main chamber is reached, and the cover will be removed or, if a nozzle-shaped extension is provided, the latter will be opened. To prevent the casing from advancing prematurely in the main chamber while the piston is shifted in the casing, the cross-section of the casing may be increased adjacent the upper end of the main chamber and the enlargement may be bead-shaped. If desired, the increase in cross-section may be obtained by arranging a locking ring on the casing in a manner such that the ring will initially engage the upper edge of the main chamber, but may be removed for advancing the casing in the latter chamber. A groove may be provided in the wall of the container for engagement with the enlarged or bead-shaped portion of the casing.

Premature movement of the casing during advancement of the piston may be further prevented by lateral pressure exerted upon the container.

Referring to the afore-mentioned modification of the receptacle according to the invention wherein the lower end of the main chamber is connected to a nozzle-shaped extension, this modification is particularly advantageous in that this device may be used in the manner of a hand pump or syringe for direct application of the mixed contents of the main chamber to a predetermined area. For example, dental cement or plastic filling material may be injected directly into a cavity formed in a tooth. It is advisable to keep the nozzle-shaped extension closed during mixing, that is, to perform the mixing operation only in that part of the main chamber which has a relatively large cross-section since otherwise the mixture might be inhomogeneous. To this end, the nozzle-shaped extension may be closed, e.g., by a portion integral with the bottom of the main chamber and to be ruptured after mixing the ingredients, or by means of a plug which will be pulled out after mixing. However, in simple cases it will be sufficient to make the nozzle-shaped extension integral with the container, to provide the extension with a closed tip, and merely to cut off the tip of the extension after the ingredients have been mixed (if the container consists of plastics or thin sheet metal) or to break off the tip (if the container consists of glass).

It should be noted that contrary to the casing, the container need not comprise a material which is absolutely resistant to the liquid or pasty substance or substances, provided the pulverulent ingredient proper is inert, since the mixing operation merely requires a few seconds of time when an automatic oscillating mixer is used.

In the drawings which illustrate several embodiments of the invention by way of example, FIG. 1 is a longitudinal section through a receptacle according to the invention;

Figure 1:
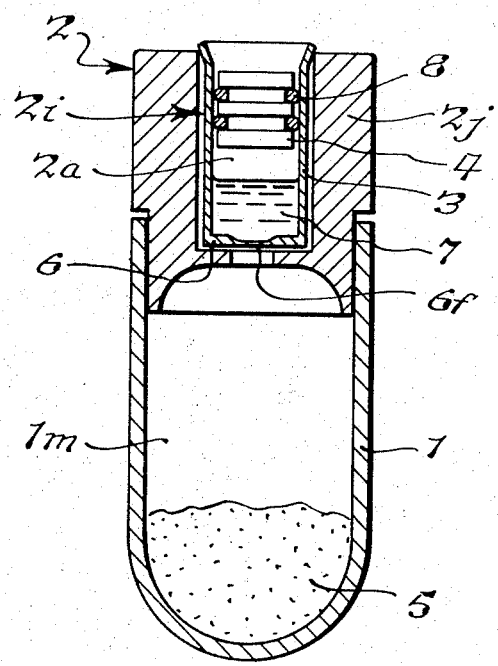

Referring now to the drawings in detail, FIG. 1 shows a receptacle which comprises a rigid container 1 forming a main or mixing chamber 1m for initially storing a pulverulent ingredient 5 and then mixing it with other material when required. In this embodiment, a shiftable casing generally indicated at 2 comprises an inner member generally indicated at 2i and a jacket 2j. The latter is perforated at its lower end and provided with a concave recess facing downwardly. As shown, the jacket is supported on the upper edge of container 1 which has an internal wall surface forming the main chamber, the jacket 2j engaging a portion of this internal surface. Inner member 2i which is seated in the jacket 2j is provided with a sleeve-like side wall 3 and a bottom 6 so as to form an additional chamber 2a for initially storing liquid or pasty material 7. The casing 2 is constructed to be resistant to the liquid or pasty material during storage thereof in that the inner member 2i contacted by the liquid or pasty material during storage is made of plastics, aluminum, glass or the like, which will not be dissolved or swelled by the liquid or pasty material. A piston or plug 4 engages the inner member 2i in sealing relationship to close chamber 2a towards the outside, and comprises rubber, plastics or the like which likewise will not be dissolved or swelled by the material 7. Bottom 6 of the inner member 2i serves to initially separate the liquid or pasty material 7 from the pulverulent ingredient 5, the bottom 6 including a frangible, relatively thin bottom portion 6f. The piston or plug 4 is movable relative to casing 2 and bottom 6 thereof, has a closed lower end facing the bottom 6, and is provided with one or more sealing or piston rings 8 inserted in grooves of the piston. If desired, the piston or plug 4 may have outer thread thereon for sealing engagement with corresponding internal thread in member 2i. A sufficient space is left in chamber 2a above the liquid or paste for the development of vapor. When piston 4 is advanced towards bottom 6, the material 7 will be caused first to rupture the frangible bottom portion 6f and then to enter the main chamber 1m for admixture to the pulverulent material 5. After thorough mixing, the product such as a dental preparation is ready for use. Casing 2 will be removed, and the ready product may then be taken out of container 1 by means such as a spatula.

Figure 2:
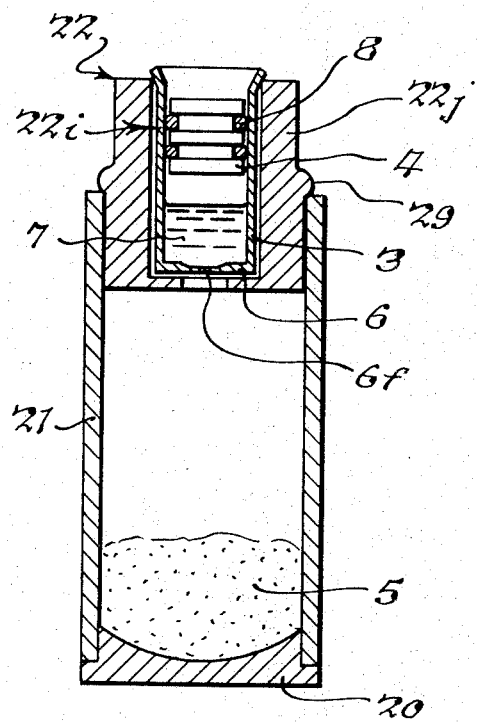
FIG. 2 is a longitudinal section through a modified form of the receptacle.

FIG. 2 illustrates an embodiment which is provided with a modified container 21 operable at its lower end and a modified casing 22 movable in the container to facilitate the discharge of finished mixtures. Certain other parts such as the piston 4 correspond to those shown in FIG. 1. Casing 22 is again of the composite type, but its jacket 22j has a slight outer, bead-shaped projection 29 thereon for initial engagement with the upper edge of container 21 to keep casing 22 in place while a moderate force is applied to piston 4 to advance it in the inner member 22i of the casing. After the stroke of piston 4 relative to the casing has been completed and the liquid or pasty material 7 has been transferred to the container 21 and mixed with the pulverulent ingredient 5, a greater force will be applied to move casing 22 and its slight projection 29 into the container 21 and advance the casing downwardly.

Premature advancement of casing 22 may also be prevented by applying pressure to opposite sides of container 21 while piston 4 is advanced into the casing.

Container 21 is provided at its lower end with a removable cover 20 extending into the container and normally held in place by friction. When casing 22 is moved downwardly, the cover 20 will be expelled from container 21 together with the ready dental preparation. If desired, however, cover 20 may be in the form of a cap which may either frictionally engage the outside of container 21, or have a threaded connection therewith requiring removal of the cap before starting to expel the mixture.

Figure 3:
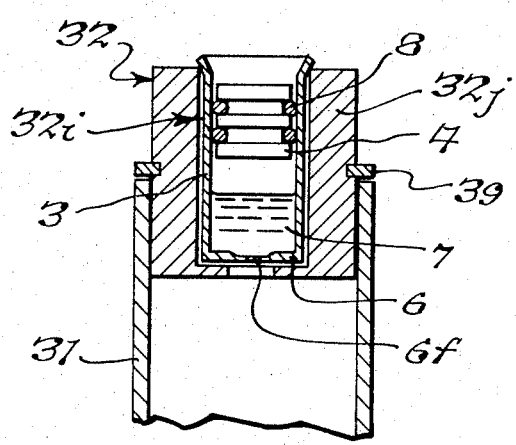
FIGS. 3 and 4 are fragmentary sections showing other modifications.

FIG. 3 shows the upper part of a receptacle which is similar to the receptacle of FIG. 2, except for the fact that instead of a bead-shaped projection, a locking ring 39 is provided which is inserted in a groove of jacket 32j for engagement with the upper edge of container 31. The locking ring will be removed before casing 32 comprising jacket 32j and inner member 32i is advanced in container 31.

Figure 4:
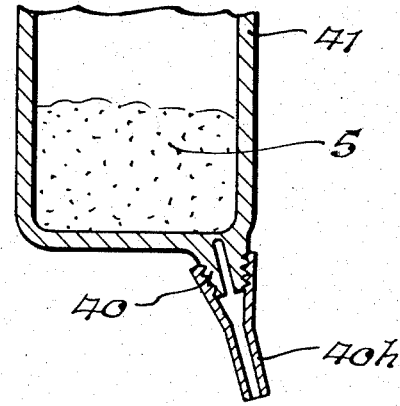

FIG. 4 illustrates the lower part of a container 41 which has a short nozzle-like extension 40. The latter may be initially closed by means such as described subsequently in connection with FIGS. 6 and 7. After mixing, the extension will be opened to expel the ready dental preparation produced. A hose portion 40h may be connected to the extension 40 to facilitate injection of a dental preparation directly into a tooth cavity.

Figure 5:
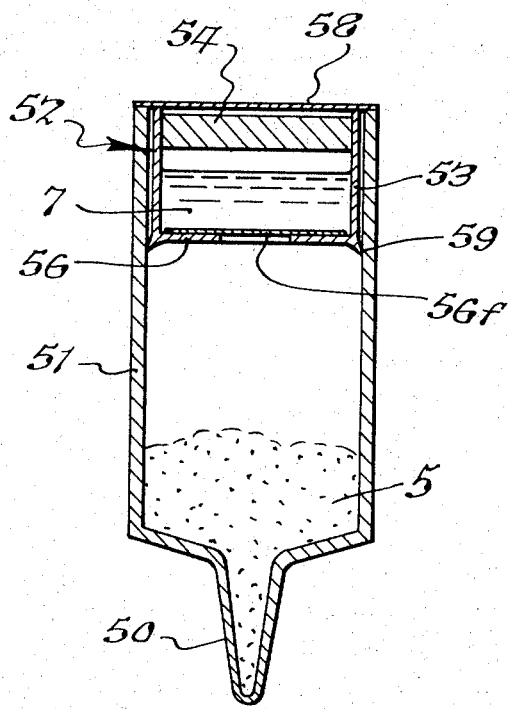
FIG. 5 is a longitudinal section through a receptacle which is further modified.

FIG. 5 shows an embodiment wherein the casing is formed by a single member generally indicated at 52, instead of comprising a jacket and an inner member. Side wall 53 of the unitary casing or member 52 fits snugly in container 51 for movement therein, but the casing is initially held in place by projecting means 59 at its lower end. Bottom 56 of the casing has a central, circular opening therein which is initially closed by a frangible, relatively thin disk 56f. This disk may be made of compound foil comprising an upper layer of metal and a lower layer of plastics, and the latter layer may be secured to casing 52, in particular to the bottom 56 thereof, by welding. Casing 52 again serves for storing the liquid or pasty material 7 and provides sufficient space for the development of vapor. A plug or piston 54 which closes the upper end of casing 52 has a height smaller than that of the pistons shown in FIGS. 1 to 3, but is equipped with a sealing member or disk 58 at its top.

The lower end of storing and mixing container 51 is provided with a nozzle-shaped extension 50 having a closed tip. To expel a finished and ready preparation after mixing, it is merely necessary to cut off the closed tip of the extension by means of a pair of scissors (if the container consists of plastics) or to break off the tip (if the container consists of glass).

Figure 6:
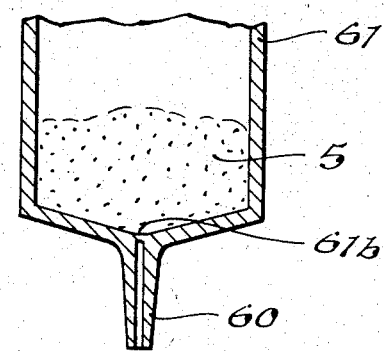
FIGS. 6 and 7 are fragmentary sections illustrating still other modifications.

FIG. 6 illustrates the lower part of a container 61 having a nozzle-like extension 60 which is closed by a bottom portion 61b. After mixing, the bottom portion 61b is pierced so that the finished and ready preparation may be expelled from the receptacle.

Figure 7:
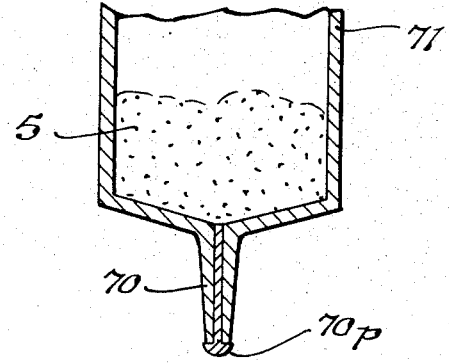

FIG. 7 is similar to FIG. 6, except for the fact that the nozzle-like extension 70 of container 71 is initially closed by a plug 70p which will be pulled out of the extension after mixing.

Of course, various modifications of upper and lower elements of the receptacle may be combined with each other; for example, the upper portion according to FIG. 2 or 3 may be combined with the lower portion according to FIG. 4, 5, 6, or 7. Further, the upper portion according to FIG. 5 may be combined with the lower portion according to FIG. 2, 4, 6, or 7.

As indicated, for thorough mixing of ingredients the receptacle is preferably clamped in the fork of an automatic oscillating mixer (frequency range about 3,500 to 7,000, or preferably 4,000 to 5,000, oscillations per minute), whereby a homogeneous mixture will be obtained within a few seconds. If desired, the mixing operation may be performed in a vacuum. To this end, the receptacle may be enclosed in an outer capsule which will be evacuated.

If glass is used as the material for the inner members 2i, 22i, and 32i of FIGS. 1, 2 and 3, respectively, or for the frangible disk 56f of FIG. 5, it is advisable to place a platelike screen over or under the bottom opening of the respective jacket in FIGS. 1 to 3 or of the unitary casing 52 in FIG. 5 to prevent broken glass particles from falling into the main chamber.

Instead of a single bottom opening in each of the jackets of FIGS. 1 to 3 and in the unitary casing of FIG. 5, several openings may be provided so that the frangible separating means is ruptured over all the openings. The latter may be arranged in a manner such that a screen or sieve is formed.

As mentioned, the receptacle according to the invention may be adapted for storing a plurality of liquid or pasty materials. For this purpose, the mixing container may have the shape of a tube and pair of casings may be provided, each end of the tube receiving one of the casings. An arrangement of this type may be obtained, for example, by combining two upper parts of the embodiments according to FIG. 1, 2, or 5.

Various other modifications and changes may be made without departing from the scope of the invention as defined in the appended claims.

What is claimed is:

1. A multi-chamber receptacle for initially storing and subsequently mixing at least one pulverulent ingredient and one liquid or pasty material for making a product such as a dental preparation ready for use, said ingredient and material being capable of reacting with each other; comprising a container forming a main chamber for initially storing said pulverulent ingredient and for subsequently mixing it with said material; composite casing means insertable in said main chamber at one end thereof and forming at least one additional chamber for initial storage of said material; a first component of said casing means in the shape of an inner sleeve-like member constructed to resist said material during said storage thereof; a bottom provided on said inner member and arranged to separate said main and additional chambers from each other during said initial storage, said bottom having a relatively thin, frangible portion; a second component of said casing means in the shape of a jacket substantially surrounding said inner member and having a perforation aligned with said frangible portion; piston means resistant to said material and movable within said inner member in sealing relationship therewith, said piston means having a closed end facing said bottom and being initially spaced therefrom in a manner such that, through movement of said piston means towards said bottom, said material will be caused to rupture said frangible portion and then enter said main chamber for admixture to said pulverulent ingredient; and releasable closure means at the other end of said main chamber.

2. A receptacle as defined in claim 1, wherein said releasable closure means comprises a removable cover positioned on said container.

3. A receptacle as defined in claim 1, wherein said releasable closure means comprises a nozzle-shaped extension provided on said container and having a passage therethrough; and a plug for insertion in said passage until after mixing; said extension and said plug having approximately the same length so that said passage will be closed substantially throughout its entire length during mixing.

4. A receptacle as defined in claim 1, including projecting means on said casing means for engaging said container and thereby holding said casing means initially adjacent said one end of the main chamber against movement toward said other end of the latter but permitting said movement upon application of a predetermined force, whereby after release of said closure means, the mixed ingredient and material may be expelled from said main chamber at said other end thereof.

5. A receptacle as defined in claim 4, wherein said projecting means comprises a bead on the circumference of said casing means.

6. A receptacle as defined in claim 1, wherein said releasable closure means comprises a nozzle-shaped extension of said container, said extension having an entry end and a discharge end.

7. A receptacle as defined in claim 6, including a breakable bottom portion on said container for closing said entry end of the extension until after mixing so that said mixing will take place in the main chamber only.

* * * * *